US009299154B2

(12) United States Patent
Thebault et al.

(10) Patent No.: US 9,299,154 B2

(45) Date of Patent: Mar. 29, 2016

(54) METHOD AND DEVICE FOR FILTERING A DISPARITY MAP

(71) Applicant: THOMSON LICENSING, Issy de Moulineaux (FR)

(72) Inventors: Cedric Thebault, Chantepie (FR); Philippe Robert, Rennes (FR); Sylvain Thiebaud, Noyal sur Vilaine (FR)

(73) Assignee: Thomson Licensing, Issy les Moulineaux (FR)

(*) Notice: Subject to any disclaimer, the term of this patent is extended or adjusted under 35 U.S.C. 154(b) by 0 days.

(21) Appl. No.: 14/347,045

(22) PCT Filed: Sep. 27, 2012

(86) PCT No.: PCT/FR2012/052195

§ 371 (c)(1), (2) Date: Mar. 25, 2014

(87) PCT Pub. No.: WO2013/045853

PCT Pub. Date: Apr. 4, 2013

(65) Prior Publication Data

US 2014/0226899 A1 Aug. 14, 2014

(30) Foreign Application Priority Data

Sep. 29, 2011 (FR) .................................... 11 58739

(51) Int. Cl.

| | |
|---|---|
| ***G06K 9/00*** | (2006.01) |
| ***G06T 7/00*** | (2006.01) |
| ***H04N 13/00*** | (2006.01) |

(52) U.S. Cl.

CPC .......... *G06T 7/0075* (2013.01); *H04N 13/0011* (2013.01); *H04N 13/0018* (2013.01);

(Continued)

(58) Field of Classification Search

CPC .......... H04N 13/0011; H04N 13/0018; H04N 13/0022; G06T 7/0075

USPC ................ 382/154; 345/419; 348/42; 356/12

See application file for complete search history.

(56) References Cited

U.S. PATENT DOCUMENTS

| | | | | |
|---|---|---|---|---|
| 8,977,038 | B2 * | 3/2015 | Tian et al. | 382/154 |
| 2005/0285874 | A1 | 12/2005 | Zitnick, III et al. | |

(Continued)

FOREIGN PATENT DOCUMENTS

| | | |
|---|---|---|
| WO | WO2009061305 | 5/2009 |
| WO | WO2010035223 | 4/2010 |
| WO | WO2011097306 | 8/2011 |

OTHER PUBLICATIONS

Lai, Polin et al.,"Depth Map Processing With Iterative Joint Multilateral Filtering", 28th Picture Coding Symposium, PC2010, Dec. 8-10, 2010, Nagoya, Japan, pp. 9-12.*

(Continued)

*Primary Examiner* — Samir Ahmed

(74) *Attorney, Agent, or Firm* — Robert D. Shedd; Paul P. Kiel; Xiaoan Lu

(57) ABSTRACT

The invention relates to a method for filtering a disparity map associated with one of the views of a stereoscopic image comprising the steps of identifying the pixels ($x_n$) with which is associated an erroneous disparity value ($d(x_n)$) by comparison with the disparity values of the neighbouring pixels ($x_{n-1}$, $x_{n+1}$) and correcting the disparity values of the identified pixels.

15 Claims, 4 Drawing Sheets

(52) U.S. Cl.
CPC .. *H04N13/0022* (2013.01); *G06T 2207/10012* (2013.01); *G06T 2207/10028* (2013.01); *G06T 2207/20024* (2013.01)

(56) References Cited

U.S. PATENT DOCUMENTS

| | | | | |
|---|---|---|---|---|
| 2010/0026712 | A1 | 2/2010 | Aliprandi et al. | |
| 2010/0195716 | A1 | 8/2010 | Klein Gunnewiek et al. | |
| 2010/0215251 | A1 | 8/2010 | Klein Gunnewiek et al. | |
| 2010/0315412 | A1 | 12/2010 | Sinha et al. | |
| 2010/0316284 | A1 | 12/2010 | Jeong et al. | |
| 2011/0080464 | A1* | 4/2011 | Alessandrini et al. | 348/42 |
| 2011/0199469 | A1* | 8/2011 | Gallagher | 348/60 |
| 2011/0285813 | A1* | 11/2011 | Girdzijauskas et al. | 348/42 |
| 2013/0077852 | A1* | 3/2013 | Chang et al. | 382/154 |
| 2014/0035909 | A1* | 2/2014 | Abramoff et al. | 345/419 |

OTHER PUBLICATIONS

Lim etal, "Region-based adaptive bilateral filter in depth map coding",2011 18th IEEE International Conference on, IEEE,Sep. 11, 2011, pp. 121-124.
Yang etal "Spatial-Depth Super Resolution for Range Images", IEEE Conference on Computer Vision and Pattern Recognition;Jun. 1, 2007, pp. 1-8.
Chen etal: "Efficient Depth Image Based Rendering with Edge Dependent DepthFilter and Interpolation", IEEE International Conf. on Multimedia and Expo, 2005, pp. 1314-1317.
Search Report Dated Jan. 18, 2013.
Devernay et al. "Adapting stereoscopic movies to the viewing conditions using depth-preserving and artifact-free novel view synthesis" Proc. SPIE 7863, paper 1, 2011.
Scharstein et al. "A taxonomy and evaluation of dense two-frame stereo correspondence algorithms" IJCV, 47, 7-42, 2002.
Sun et al. "Symmetric stereo matching for occlusion handling" Proc. IEEE CVPR, 2, 399-406, 2005.
Zitnick et al. "A cooperative algorithm for stereo matching and occlusion detection" PAMI, 22(7), 675-68, Jul. 2000.
Yang et al. "Stereo matching with color-weighted correlation, hierarchical belief propagation and occlusion handling" IEEE Trans. on PAMI, 31 ( 3), 492-504, Mar. 2009.
Boughorbel et al. "Adaptive filters for depth from stereo and occlusion detection" Proc SPIE 6803, paper 17, 2008.
Paris et al. "A gentle introduction to bilateral filtering and its applications" in ACM SIGGRAPH Courses, 2007.
Tzovaras et al. "Evaluation of Multiresolution Block Matching Techniques for Motion and Disparity Estimation" Signal Processing: Image Communication, 6 (1), 59-67, Mar. 6, 1994.
Egnal et al. "Detecting binocular half-occlusions: empirical comparisons of five approaches" IEEE Trans. on PAMI, 24(8), 1127-1133, Aug. 2002.
Scharstein et al. "Stereo vision for view synthesis" Proc. IEEE CVPR, 852-858, Jun. 1996.
Zytnick et al. "High-quality video view interpolation using a layered representation" ACM SIGGRAPH, 600-608, 2004.
Hassinoff et al. "Boundary matting for view synthesis" CVIU, 103 (1), 22-32, 2006.
Conze et al. "Objective view synthesis quality assessment" Proc. SPIE 8288, Paper 56, 2012.
Bosc et al. "Towards a new quality metric for 3D synthesized view assessment" IEEE Journal on Selected Topics in Signal Processing, 5 (7), 1332-1343, Nov. 2011.
Mueller et al. "Adaptive cross-trilateral depth map filtering" Proc. 3DTV conference, 2010.
Ndjiki Nya et al. "Depth image based rendering with advanced texture synthesis" IEEE Trans. on Multimedia, 13 (3), 453-465, Jun. 2011.
Wang et al. "Image quality assessment: From error visibility to structural similarity" IEEE Trans. on Image Processing, 13(4), 600-612, Apr. 2004.
Xiong et al.: "Stereo Matching on Objects with Fractional Boundary" Proc IEEE CVPR, 1-8 (2007).

* cited by examiner

METHOD AND DEVICE FOR FILTERING A DISPARITY MAP

This application claims the benefit, under 35 U.S.C. §365 of International Application PCT/FR12/052195, filed Sep. 27, 2012, which was published in accordance with PCT Article 21(2) on Apr. 4, 2013 in French and which claims the benefit of French patent application No. 1158739, filed on Sep. 29, 2011.

The present invention relates to a stereoscopic image and more specifically to a method and a device for filtering the disparity map associated with such an image.

3D view synthesis or 3D view interpolation consists in creating a 3D rendering other than that represented by the source stereoscopic image. The 3D rendering is then adjusted to the chosen application or to the user. The views necessary for addressing multi-view screens are mostly recreated from a single stereoscopic image.

In fact, this view synthesis is based on the stereoscopic image and a disparity map. The disparity map is generally associated with a right or left source image in the case of a stereoscopic image and provides for each picture element an item of data representing the distance (in number of pixels) between the position of this picture element in the right image and in the left image.

This view synthesis can also be based on a depth map as it is possible to return to a depth value from the disparity value, or vice versa, by introducing certain items of data, such as the size of the screen or the distance between the observer and the screen using an algorithm known to those skilled in the art.

To create a new view by interpolation from a right or left source image and the associated disparity map, this disparity map is projected at the view that we want to generate. After this projection, a modified disparity map corresponding to the desired view is available; each pixel of this modified disparity map indicates a disparity value which will then be used to adapt the items of information corresponding to the right or left image to be regenerated.

The disparity vector of each pixel to be interpolated must point to the same object points in the right and left images.

However, it is necessary to manage occultation zones as there are pixels in the image to be interpolated which support object points visible in one image and absent in the other. In fact, these objects which are in the field of a first view, are either outside the field of a scene of a second view, or occulted by a foreground object. These particular pixels must be interpolated only from the image which contains the corresponding point. It is therefore necessary to identify these particular pixels and to assign them a disparity.

The document US2010/0215251 describes a method and a device for processing a depth map. The method consists in obtaining a depth map based on a compressed depth map comprising depth information of a captured scene. The scene comprises an object. Occlusion information comprising the information occluded by the object in the depth map is provided. At least a part of the occlusion information is then used to reduce the distortions of contoured objects in the depth map.

This document therefore relates to a method for processing information for the correction of a depth map in relation to a zone occulted by an object.

The purpose of our invention is to overcome a different problem which relates to the so-called transition pixels situated on the edges of objects. In fact, if for example a scene comprises two flat objects situated at fixed and distinct depths, the disparity map associated with the elements of the right view or the left view should only contain two values, the value of the disparity of the first object and the distinct value of the disparity of the second object given that there are in the scene only two possibilities with two different disparities.

The disparity map only containing two disparity values, it is in this case easy to project this disparity map onto an intermediate view between the left view and the right view and thus to interpolate one of the two images.

Yet this is not the case as in the so-called transition zones corresponding to the zones bordering the two objects, the disparity value associated with the so-called transition pixels results from a mixture of the disparity value of the pixel of the first object and that of the second object.

It is unfortunately impossible to correctly define a disparity value for such pixels.

We will therefore find ourselves with an intermediate disparity value between the disparity values of one object and the other object. Unfortunately, this disparity value is not correct as it does not point to similar pixels in the two images.

During the projection of the disparity map, such values will be on one hand discordant, and on the other hand not pointing to the same objects in the two images which can lead to visible artefacts on the interpolated views.

This problem of erroneous or aberrant disparity value is present in the disparity maps obtained by a disparity map estimator and in disparity maps for CGI contents.

A possible solution to the above-mentioned problem would be to use unfiltered disparity maps (that is to say crenellated at the contours of the objects). Unfortunately although it is possible to envisage this type of map for CGI content, the disparity estimators will more often than not naturally generate intermediate values between the different objects. The present invention proposes a method enabling the disadvantages mentioned to be overcome.

The invention consists of a method for filtering a disparity map associated with one of the views of a stereoscopic image comprising at least one object partially covering a zone occulted by this object. The method comprises the steps of determining at least one transition zone around the object, identifying the pixels of this transition zone whose disparity value is considered erroneous by comparison with the disparity values of the neighbouring pixels corresponding either to the object or to the occulted zone and correcting the disparity values of the identified pixels by assignment of a new disparity value dependent either on the object or on the occulted zone according to criteria relating to the whether the pixel belongs to the object or the occulted zone.

This method therefore enables an intelligent filtering which only filters the doubtful disparity values and therefore preserves the majority of the disparity map.

Preferentially, the step of identifying the pixels having an erroneous disparity value consists in identifying as erroneous any pixel whose disparity value is not comprised between the disparity values of the neighbouring pixels ($x_{n-1}$, $x_{n+1}$).

According to a variant of the invention, the step of identifying the pixels having an erroneous disparity value consists in identifying as erroneous any pixel whose disparity value is different from the disparity values of the neighbouring pixels ($x_{n-1}$, $x_{n+1}$) by a determined threshold value.

Preferentially the step of correcting the erroneous disparity values of the pixels consists in replacing the disparity value of the identified pixels with a value calculated according to the disparities of the neighbouring pixels.

According to a variant of the invention, the step of correcting the erroneous disparity values of the pixels consists in removing the disparity value of the identified pixels.

Preferentially, the step of correcting the disparity values of the pixels consists in determining to which disparity value of the neighbouring pixels ($x_{n-1}$,$x_{n+1}$) the disparity value of the identified pixel is closer, then in replacing the disparity value of the identified pixel with a replacement value corresponding to the value of one of the neighbouring pixels ($x_{n-1}$, $x_{n+1}$) whose disparity value is the closer.

Preferentially, the method comprises the additional step, after determining the pixel of greater proximity from among the two neighbouring pixels ($x_{n-1}$, $x_{n+1}$), of determining the difference in disparity values between that of the neighbouring pixel and that of the next neighbouring pixel ($x_{n-2}$, $x_{n+2}$) and of determining according to this difference the replacement value.

The invention also consists of a device for generating signals for displaying three-dimensional images comprising at least one object partially covering a zone occulted by this object comprising a device for transmitting a first data stream corresponding to one of the right or left images to be transmitted and a second data stream corresponding to the depth map associated with one of the right or left images to be transmitted and a device for receiving data streams for displaying three-dimensional images. It comprises a device for filtering the disparity map comprising means for determining at least one transition zone around the object, means for identifying the pixels ($x_n$) of this transition zone whose disparity value ($d(x_n)$) is considered erroneous by comparison with the disparity values of the neighbouring pixels ($x_{n-1}$, $x_{n+1}$) corresponding either to the object or to the occulted zone and means for correcting the erroneous disparity values of the identified pixels.

The characteristics and advantages of the aforementioned invention as well as others will emerge more clearly upon reading the following description made with reference to the drawings attached, wherein.

Figure 1:
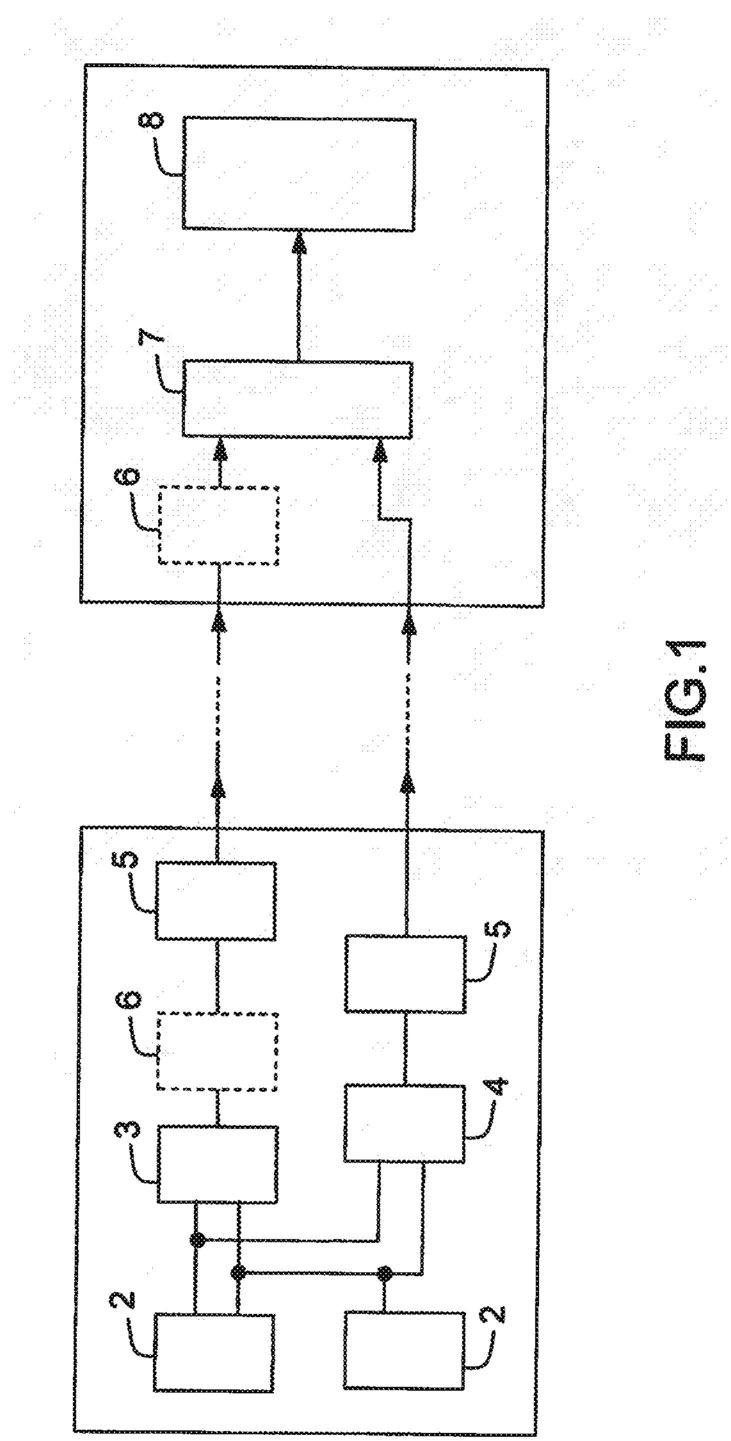
FIG. 1 shows a system for delivering 3D content and containing a device for filtering elements of a disparity map according to the invention either at the signal generation device, or at the receiver.

The system as shown by FIG. 1 is a device for generating signals for displaying at least one three-dimensional (3D) image. It comprises in the transmission device a means for generating 2 two data streams representing the pixels, or picture elements of the right and left images respectively, a means for generating 3 a data stream corresponding to the disparity information of the pixels of the right or left image represented by a disparity map for each image, a means for selecting 4 one of the data streams of the right or left image to be transmitted, a means for transmitting 5 one of the data streams corresponding to the right or left image selected and the data stream corresponding to the disparity map. It also comprises according to the invention a device for filtering 6 disparity values of the different elements of the disparity map enabling the detection of erroneous values and the replacement of these values with other disparity values dependent on the disparities of the neighbouring elements of the disparity map associated with the means for generating the data of the disparity map.

A data reception device receives the two data streams corresponding to one of the right or left images and to the disparity map respectively and provides via an interface 7 the 3D image display signals to a screen or display device 8. According to a variant of the invention the device for filtering 6 the disparity map is situated at the signal reception device and not at the transmission device.

The method according to the invention consists in filtering the disparity map 6 so as to determine, eliminate or replace the "doubtful" disparity values. By "doubtful" disparity value is understood the disparity values of pixels of transition zones which do not correspond to one of the disparity values of the neighbouring pixels.

This method enables an intelligent filtering which only filters the doubtful disparity values and therefore preserves the majority of the disparity map.

The disparity map represents a sampled item of information. It is therefore necessary to resolve the sampling problems. This is why the method according to the invention consists in filtering the disparity map in order to improve the contours of the objects which experience this sampling fault.

This filtering method must on one hand correctly identify the erroneous disparity values, and on the other hand correct these values.

The erroneous disparity values are intermediate values between the real disparity values since these disparity values correspond to depths where an object is situated. But the disparity values may be locally increasing or decreasing in the presence of a surface not parallel to the plane of the screen. The definition of the detection algorithm must take account of these different cases.

It is also preferable to have a solution whose results are continuous to avoid artefacts due to neighbouring and similar pixels comprising different corrections, or to an object edge corrected differently from one frame to another. For this reason it is therefore advisable to replace the disparity values rather than to remove them. However it is nevertheless conceivable to remove these values if artefacts must be removed.

The method proposed here is associated with a study of the pixels belonging to a horizontal line along the x axis, but it would also be possible to use vertical information.

The disparity values $d(x_n)$ of pixels $x_n$ are determined as erroneous if these values differ from the disparity values $d(x_{n-1})$ and $d(x_{n-1})$ of the two horizontally directly neighbouring pixels $x_{n-1}$ and $x_{n+1}$ by a value greater than the difference $|d(x_{n+2})-d(x_{n+1})|$ between this latter value $d(x_{n+1})$ and that $d(x_{n+2})$ of its other horizontally neighbouring pixel ($x_{n+2}$) or by a value greater than the difference $|d(x_{n-2})-d(x_{n-1})|$ between this latter value $d(x_{n-1})$ and that $d(x_{n-2})$ of its other horizontally neighbouring pixel ($x_{n-2}$).

According to a variant of the invention, other criteria can be used to define what will be considered as erroneous disparity values. One method consists in comparing the disparity value of a pixel with a threshold value determined according to the disparities of the neighbouring pixels.

Threshold values can thus be added. For example, it is possible to determine as erroneous the pixels whose disparity values (expressed in pixels) differ by plus 2 pixels with respect to its two neighbours.

In the case where these erroneous values should be removed, it is preferable to use a less strict criterion so as to remove the fewest possible.

In a method according to the invention, the determination of the erroneous disparity values is done by comparing these values $d(x_n)$ with the disparity values $d(x_{n-2})$, $d(x_{n-1})$, $d(x_{n+1})$ or $d(x_{n-1})$, $d(x_{n+1})$, $d(x_{n+2})$ of four other neighboring pixels $x_{n-2}$ $x_{n-1}$ $x_{n+1}$ $x_{n+2}$.

Figure 2:
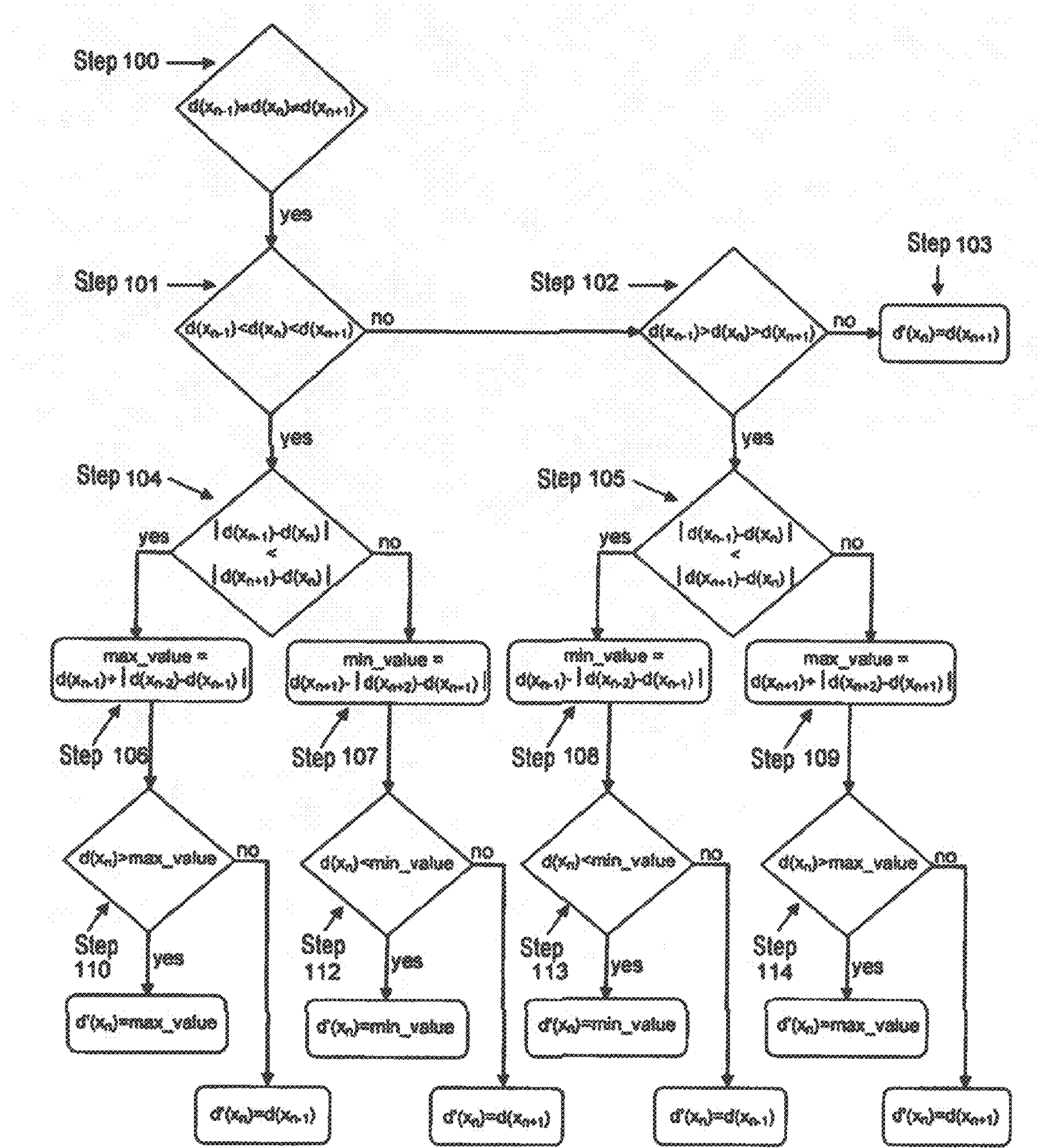
FIG. 2 shows a synoptic diagram explaining a method for filtering according to the invention.

A synoptic diagram for detecting and correcting pixels having erroneous disparity values is shown in FIG. 2.

The first step 100 corresponds to identifying the pixels N having erroneous disparity values by comparison with the disparity values of the neighbouring pixels N−1 and N+1:

$$d(x_n)\neq d(x_{n-1})$$

and $$d(x_n)\neq d(x_{n+1})$$

Steps 101 and 102 then make it possible to determine whether the disparity $d(x_n)$ of the pixel $x_n$ is comprised between those disparities $d(x_{n-1})$ and $d(x_{n+1})$ of the pixels $x_{n-1}$ and $x_{n+1}$ and, in step 101 and in step 102, to compare the pixels $x_{n-1}$ and $x_{n+1}$:

$$d(x_{n-1})<d(x_n)<d(x_{n+1})$$

or $$d(x_{n-1})>d(x_n)>d(x_{n+1})$$

Step 103 corresponds to the case where the value of the disparity is not comprised between those of the neighbouring pixels. A correction of this value is necessary. This value can be replaced with the closer disparity value or can be removed.

Then in steps 104 and 105, the difference in disparity between the pixels $x_n$ and $x_{n-1}$ is compared to that between $x_n$ and $x_{n+1}$. These steps correspond to a proximity study determining whether the disparity value of $x_n$ is closer to that of $x_{n+1}$ or of $x_{n-1}$. In the case of a pixel situated at the border between two objects, this means determining to which object this pixel is closer:

$$|d(x_{n-1})-d(x_n)|<|d(x_{n+1})-d(x_n)|,$$

Step 106 makes it possible to take account of a variable (increasing or decreasing) disparity for the object corresponding to the pixels $x_{n-1}$ and $x_{n-2}$. This step therefore makes it possible to determine a replacement disparity value for $(x_n)$ corresponding to the maximum value of the sum of the disparity $d(x_{n-1})$ of the pixel $x_{n-1}$ and the difference between the disparities $d(x_{n-2})$ and $d(x_{n-1})$ of the pixels $x_{n-2}$ and $x_{n-1}$.

Similarly, during steps 107, 108 and 109, the disparity replacement values for $(x_n)$ are determined by taking account of a variable disparity for the objects corresponding to the neighbouring pixels $x_{n-2}$ and $x_{n-1}$ or $x_{n+1}$ and $x_{n+2}$. Maximum values are determined if $d(x_n)$ is closer to the greater value of the two disparity values. And minimum values are determined if $d(x_n)$ is closer to the smaller value of the two disparity values.

During step 110, if the erroneous disparity value of the pixel is greater than this maximum value determined in step 106, the erroneous disparity value of the pixel $x_n$ is replaced with this maximum determined value: $d'(x_n)$=max value.

During this step 110, if the erroneous disparity value of the pixel is not greater than this maximum value determined in step 106, the erroneous disparity value of the pixel $x_n$ is replaced with the disparity value of the pixel $x_{n-1}$: $d'(x_n)=d(x_{n-1})$.

Likewise, during step 112, the erroneous disparity value of the pixel $x_n$ is replaced with the minimum value determined during the previous step: "$d'(x_n)$=min value" or with the disparity value of the following pixel $x_{n+1}$: "$d'(x_n)=d(x_{n+1})$".

Similarly, during steps 114 and 116, the erroneous disparity value of the pixel $x_n$ is replaced with the minimum or maximum value determined during the previous step or with the disparity value of the following pixel $x_{n+1}$ or previous pixel $x_{n-1}$.

According to a variant of the invention, the process described by the synoptic diagram can be refined by taking account of a large change in disparity or particular cases.

Steps 110-116 therefore preferably assign a new value to the disparity value according to the previous criteria. It is alternatively possible to replace this step with a removal of the disparity value.

In all the cases not covered, the disparity value is considered correct and not replaced.

The filtering method proposed by the invention is symmetrical and therefore processes the right and left edges of objects in the same way even though the problems associated with these edges are different.

In fact, the examples relate to the interpolation of the right edge of foreground objects from the disparity map associated with the left view or the interpolation of the left edge of foreground objects from the disparity map associated with the right view as artefact problems are more significant here.

The two other configurations, either the interpolation of the left edge of foreground objects from the disparity map associated with the left view or the interpolation of the right edge of foreground objects from the disparity map associated with the right view, pose far fewer problems since the projections of the erroneous values are more often than not occulted by the foreground object. However, a pre-filtering is useful since a part of the edge of the foreground object can in some cases be recovered.

According to a variant of the invention, the method ensures processing on the right edge of foreground objects for interpolation from the disparity map associated with the left view. Similarly and according to another variant of the invention, the method ensures processing on the left edge of foreground objects for interpolation from the disparity map associated with the right view.

This dissociation taking place during the first step (d(xn−1)<d(xn)<d(xn+1) or d(xn−1)>d(xn)>d(xn−1)), it would be sufficient to retain only one of these conditions in order to carry out the pre-filtering on only one side.

Figure 3:
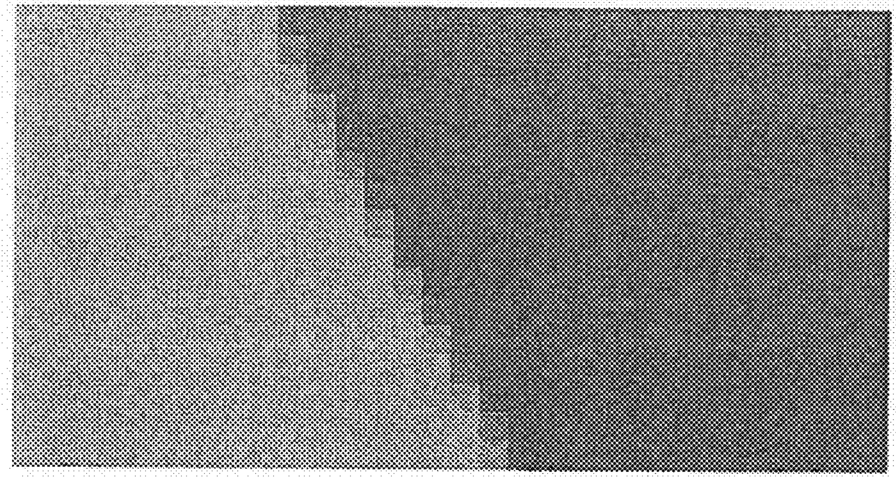
FIG. 3 shows the disparity values of a disparity map of a system without filtering device.

FIG. 3 shows the disparity values of a disparity map of an image comprising two different disparity elements of a system without filtering device. These two values are represented by a light grey and a dark grey respectively. At the transition between the two elements, there are different disparity values represented by intermediate shades of grey between the light grey and the dark grey.

Figure 4:
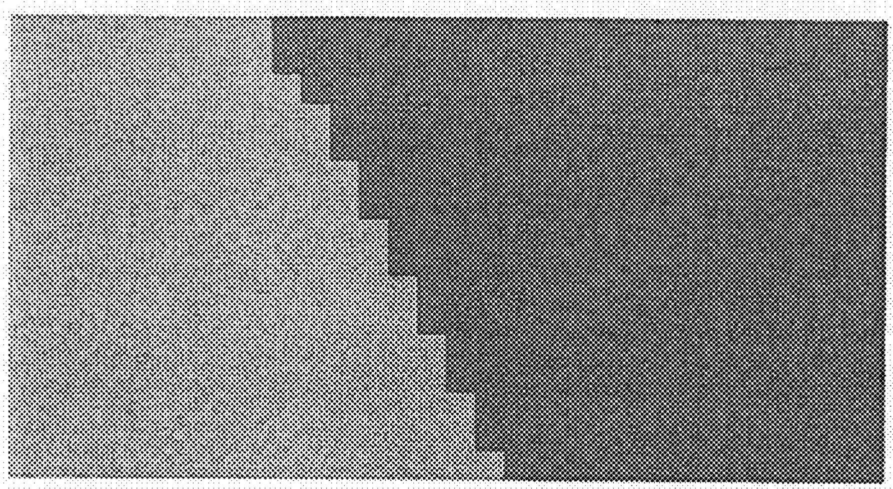
FIG. 4 shows the disparity values of a disparity map of a system with filtering device according to the invention.

FIG. 4 shows the disparity values of a disparity map of a system with filtering device according to the invention. At the transition, the erroneous disparity values have been rectified and replaced with one of the two existing values in accordance with the method according to the invention. After filtering, the disparity map comprises only two values.

The invention claimed is:

1. A method for filtering a disparity map associated with one view of a stereoscopic image comprising at least one object partially covering a first zone, comprising:

determining at least a second zone around the object, said second zone bordering said object and said first zone;

identifying at least one pixel of said at least a second zone whose disparity value is considered erroneous when the disparity value is outside an interval whose boundaries correspond to disparity values associated with neighbouring pixels that are positioned immediately before and immediately after said at least one pixel, on either a horizontal line or a vertical line, said neighbouring pixels being pixels defining at least partially either the object or the first zone;

correcting the disparity value of said at least one identified pixels by assignment of a new disparity value only as a function of disparity values of pixels defining at least partially the object, or only as a function of disparity values of the pixels defining at least partially the first zone; and performing one of (1) providing the one view of the stereoscopic image and the disparity map to a display device and (2) transmitting the one view of the stereoscopic image and the disparity map via a communication channel.

2. The method according to claim 1 wherein correcting the erroneous disparity value of said at least one pixel comprises replacing the disparity value of said at least one identified pixel with a value calculated according to the disparities of the neighbouring pixels.

3. The method according to claim 2 wherein correcting the erroneous disparity value of said at least one pixel comprises removing the disparity value of said at least one identified pixel.

4. The method according to claim 2 wherein correcting the disparity value of said at least one pixel comprises determining to which disparity value of the neighbouring pixels the disparity value of said at least one identified pixel is closer and replacing the disparity value of said at least one identified pixel with a replacement value corresponding to the disparity value of one of the neighbouring pixels whose disparity value is the closer.

5. The method according to claim 4 wherein the method further comprises:

after determining the pixel of greater proximity from among the two neighbouring pixels, determining the difference in disparity values between that of the neighbouring pixel and that of a next neighbouring pixel; and determining the replacement value by taking account of said difference.

6. An apparatus for generating signals for displaying three-dimensional images, comprising:

a filter for filtering a disparity map associated with a right or left image of said three-dimensional images, said right or left image including at least one object partially covering a first zone, configured to:

determine at least a second zone around the object, said second zone bordering said object and said first zone, identify at least one pixel of said at least a second zone whose disparity value is considered erroneous when the disparity value is outside an interval whose boundaries correspond to disparity values associated with neighbouring pixels that are positioned immediately before and immediately after said at least one pixel, on either a horizontal line or a vertical line, said neighbouring pixels being pixels defining at least partially either the object or the first zone, and correct the disparity value of said at least one identified pixel by assignment of a new disparity value only as a function of disparity values of pixels defining at least partially the object, or only as a function of disparity values of pixels defining at least partially the first zone; and a transmitter configured to transmit a first data stream corresponding to said right or left image and a second data stream corresponding to said disparity map.

7. The apparatus of claim 6, wherein the filter is configured to replace the disparity value of said at least one identified pixel with a value calculated according to the disparities of the neighbouring pixels in order to correct the erroneous disparity value of said at least one pixel.

8. The apparatus of claim 6, wherein the filter is configured to remove the disparity value of said at least one identified pixel in order to correct the erroneous disparity value of said at least one pixel.

9. The apparatus of claim 7, wherein the filter is further configured to determine to which disparity value of the neighbouring pixel the disparity value of said at least one identified pixel is closer and to replace the disparity value of said at least one identified pixel with a replacement value corresponding to the disparity value of one of the neighbouring pixel whose disparity value is the closer.

10. The apparatus of claim 9, wherein the filter is further configured to:

after determining the pixel of greater proximity from among the two neighbouring pixels, determine the difference in disparity values between that of the neighbouring pixel and that of a next neighbouring pixel; and determine the replacement value by taking account of said difference.

11. An apparatus for receiving signals for displaying three-dimensional images, comprising:

a receiver configured to receive a first data stream corresponding to a right or left image of said three-dimensional images and a second data stream corresponding to a disparity map associated with the right or left image; and a filter for filtering said disparity map, configured to:

determine at least a second zone around the object, said second zone bordering said object and said first zone, identify at least one pixel of said at least a second zone whose disparity value is considered erroneous when the disparity value is outside an interval whose boundaries correspond to disparity values associated with neighbouring pixels that are positioned immediately before and immediately after said at least one pixel, on either a horizontal line or a vertical line, said neighbouring pixels being pixels defining at least partially either the object or the first zone, and correct the disparity value of said at least one identified pixel by assignment of a new disparity value only as a function of disparity values of pixels defining at least partially the object, or only as a function of disparity values of pixels defining at least partially the first zone.

12. The apparatus of claim 11, wherein the filter is configured to replace the disparity value of said at least one identified pixel with a value calculated according to the disparities of the neighbouring pixels in order to correct the erroneous disparity value of said at least one pixel.

13. The apparatus of claim 11, wherein the filter is configured to remove the disparity value of said at least one identified pixel in order to correct the erroneous disparity value of said at least one pixel.

14. The apparatus of claim 13, wherein the filter is further configured to determine to which disparity value of the neighbouring pixels the disparity value of said at least one identified pixel is closer and to replace the disparity value of said at least one identified pixel with a replacement value corresponding to the disparity value of one of the neighbouring pixels whose disparity value is the closer.

15. The apparatus of claim 14, wherein the filter is further configured to:

after determining the pixel of greater proximity from among the two neighbouring pixels, determine the difference in disparity values between that of the neighbouring pixel and that of a next neighbouring pixel; and determine the replacement value by taking account of said difference.

* * * * *